(12) United States Patent
Okuno (10) Patent No.: US 6,603,913 B1
(45) Date of Patent: Aug. 5, 2003

(54) SINGLE-MODE OPTICAL FIBER HAVING MULTIPLE CLADDING REGIONS FOR DISPERSION COMPENSATION

(75) Inventor: Toshiaki Okuno, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/567,506

(22) Filed: May 8, 2000

Related U.S. Application Data (63) Continuation-in-part of application No. PCT/JP99/04278, filed on Aug. 6, 1999.

(30) Foreign Application Priority Data

Sep. 18, 1998 (JP) .......................... 10-265443

(51) Int. Cl.[7] ................................. G02B 6/02
(52) U.S. Cl. ...................................... 385/127
(58) Field of Search ................ 385/122, 123, 385/124, 125, 126, 127

(56) References Cited

U.S. PATENT DOCUMENTS

| | | | |
|---|---|---|---|
| 5,361,319 A | 11/1994 | Antos et al. | |
| 5,448,674 A | 9/1995 | Vengsarkar et al. | |
| 5,721,800 A | * 2/1998 | Kato et al. ................. | 385/127 |
| 5,742,723 A | * 4/1998 | Onishi et al. .............. | 385/127 |
| 5,999,679 A | 12/1999 | Antos et al. | |
| 6,335,995 B1 | * 1/2002 | Kato et al. ................. | 385/123 |
| 6,349,163 B1 | 2/2002 | Antos et al. | |
| 6,389,208 B1 | * 5/2002 | Smith ........................ | 385/127 |
| 6,529,666 B1 | * 3/2003 | Dultz et al. ................ | 385/127 |

FOREIGN PATENT DOCUMENTS

| | | |
|---|---|---|
| JP | 6-11620 | 1/1994 |
| JP | 6-222235 | 8/1994 |
| JP | 7-270636 | 10/1995 |
| JP | 8-136758 | 5/1996 |
| JP | 8-313750 | 11/1996 |
| JP | 9-127354 | 5/1997 |
| JP | 10-39155 | 2/1998 |
| JP | 10-221562 | 8/1998 |
| JP | 10-319266 | 12/1998 |

OTHER PUBLICATIONS

"1.1 Tb/s WDM Transmission Over a 150 Km 1.3 μm Zero–Dispersion Single–Mode Fiber", by Onaka et al., Optical Fiber Communication '96: Postdeadline Papers, Feb. 29, 1996, pp. PD19–2–PD19–5.
"Dispersion Compensation Design for 10Gb/s, 16 Wave WDM Transmission System over Standard single–Mode Fiber", H. Miyata, et al., 21st European Conference on Optical Communication ECOC '95, Sep. 17–21, 1995, pp. 63–65.
Optical Fiber Communications Conference and Exhibit, 1998 OSA Technical Digest Series, Feb. 22 –27, 1998, vol. 2, pp. 24–25.

* cited by examiner

*Primary Examiner*—Ricky Mack
*Assistant Examiner*—Alicia M. Harrington
(74) *Attorney, Agent, or Firm*—McDermott, Will & Emery (57) ABSTRACT

The dispersion-compensating fiber according to the present invention is an optical fiber having a structure which, when constituting an optical transmission line together with a single-mode optical fiber having a zero-dispersion wavelength near 1.3 μm, is capable of improving transmission characteristics of the whole optical transmission line and allowing the dispersion to be compensated for efficiently and the size thereof to become smaller, and has a structure for improving the total dispersion slope of the optical transmission line while in a state fully compensating for the dispersion of the single-mode optical fiber. This dispersion-compensating fiber has a triple cladding structure having a first cladding, a second cladding, and a third cladding which are successively provided on the outer periphery of a core, and, in a state where the relative refractive index differences in its individual regions and outer diameters thereof are optimized so as to compensate for the dispersion of the single-mode optical fiber, realizes an optical transmission system having a favorable total dispersion slope.

17 Claims, 5 Drawing Sheets

| Sample No. | $\Delta_1$ | $\Delta_2$ | $\Delta_3$ | 2a/2c | 2b/2c | Minimum core Min [μm] | Maximum core's outer diameter Max [μm] | Permissible range width (Max-Min) |
|---|---|---|---|---|---|---|---|---|
| 1 | 1.64 | -0.3 | 0.05 | 0.1 | 0.3 | 2.69 | 2.83 | 0.14 |
| 2 | 1.64 | -0.3 | 0.05 | 0.15 | 0.5 | 2.86 | 2.93 | 0.07 |
| 3 | 1.64 | -0.3 | 0.05 | 0.2 | 0.7 | 2.72 | 2.73 | 0.01 |
| 4 | 1.64 | -0.3 | 0.05 | 0.25 | 0.8 | 2.72 | 2.74 | 0.02 |
| 5 | 1.64 | -0.3 | 0.08 | 0.15 | 0.43 | 2.8 | 2.86 | 0.06 |
| 6 | 1.64 | -0.3 | 0.08 | 0.15 | 0.45 | 2.69 | 2.85 | 0.16 |
| 7 | 1.64 | -0.3 | 0.08 | 0.15 | 0.5 | 2.7 | 2.81 | 0.11 |
| 8 | 1.64 | -0.3 | 0.08 | 0.2 | 0.7 | 2.72 | 2.74 | 0.02 |
| 9 | 1.80 | -0.3 | 0.08 | 0.1 | 0.3 | 2.5 | 2.76 | 0.26 |
| 10 | 1.80 | -0.3 | 0.08 | 0.15 | 0.5 | 2.52 | 2.7 | 0.18 |
| 11 | 1.80 | -0.3 | 0.08 | 0.15 | 0.6 | 2.54 | 2.6 | 0.06 |
| 12 | 1.80 | -0.3 | 0.08 | 0.2 | 0.7 | 2.53 | 2.64 | 0.11 |
| 13 | 1.80 | -0.3 | 0.08 | 0.2 | 0.8 | 2.54 | 2.57 | 0.03 |

| Sample No. | $\Delta_1$ | $\Delta_2$ | $\Delta_3$ | 2a/2c | 2b/2c | Minimum core Min [$\mu$m] | Maximum core's outer diameter Max [$\mu$m] | Permissible range width (Max-Min) |
|---|---|---|---|---|---|---|---|---|
| 1 | 1.64 | -0.3 | 0.05 | 0.1 | 0.3 | 2.69 | 2.83 | 0.14 |
| 2 | 1.64 | -0.3 | 0.05 | 0.15 | 0.5 | 2.86 | 2.93 | 0.07 |
| 3 | 1.64 | -0.3 | 0.05 | 0.2 | 0.7 | 2.72 | 2.73 | 0.01 |
| 4 | 1.64 | -0.3 | 0.05 | 0.25 | 0.8 | 2.72 | 2.74 | 0.02 |
| 5 | 1.64 | -0.3 | 0.08 | 0.15 | 0.43 | 2.8 | 2.86 | 0.06 |
| 6 | 1.64 | -0.3 | 0.08 | 0.15 | 0.45 | 2.69 | 2.85 | 0.16 |
| 7 | 1.64 | -0.3 | 0.08 | 0.15 | 0.5 | 2.7 | 2.81 | 0.11 |
| 8 | 1.64 | -0.3 | 0.08 | 0.2 | 0.7 | 2.72 | 2.74 | 0.02 |
| 9 | 1.80 | -0.3 | 0.08 | 0.1 | 0.3 | 2.5 | 2.76 | 0.26 |
| 10 | 1.80 | -0.3 | 0.08 | 0.15 | 0.5 | 2.52 | 2.7 | 0.18 |
| 11 | 1.80 | -0.3 | 0.08 | 0.15 | 0.6 | 2.54 | 2.6 | 0.06 |
| 12 | 1.80 | -0.3 | 0.08 | 0.2 | 0.7 | 2.53 | 2.64 | 0.11 |
| 13 | 1.80 | -0.3 | 0.08 | 0.2 | 0.8 | 2.54 | 2.57 | 0.03 |

SINGLE-MODE OPTICAL FIBER HAVING MULTIPLE CLADDING REGIONS FOR DISPERSION COMPENSATION

RELATED APPLICATIONS

This is a Continuation-In-Part application of International Patent Application serial No. PCT/JP99/04278 filed on Aug. 6, 1999, now pending.

BACKGROUND OF THE INVENTION

1. Field of the Invention

The present invention relates to a dispersion-compensating fiber which is applied to an optical transmission line including a 1.3-μm zero-dispersion single-mode optical fiber and improves transmission characteristics of the whole optical transmission line with respect to light in a 1.55-μm wavelength band.

2. Related Background Art

In optical fiber transmission line networks used for high-speed, large-capacity communications over a long distance, the dispersion (chromatic dispersion) expressed by the sum of the material dispersion (dispersion caused by the wavelength dependence of refractive index inherent in the material of the optical fiber) and structural dispersion (dispersion caused by the wavelength dependence of the group velocity in the propagation mode) in the single-mode optical fiber employed as their transmission medium is a limiting factor for the transmission capacity. Namely, even when light outputted from a light source is assumed to have a single wavelength, it has a spectrum width in the strict sense. When such an optical pulse propagates through a single-mode optical fiber having a predetermined chromatic dispersion characteristic, the pulse form may collapse since the propagation velocity varies among definite spectral components. This dispersion is expressed by a unit (ps/km/nm) of propagation delay time difference per unit spectrum width (nm) and unit optical fiber length (km). Also, it has been known that the material dispersion and structural dispersion cancel each other in the single-mode optical fiber, so that the dispersion becomes zero in the vicinity of 1.31 μm.

As means for compensating for the dispersion of the single-mode optical fiber, a dispersion-compensating fiber is used in general. In particular, since the transmission loss of optical fibers becomes the lowest in the 1.55-μm wavelength band, it has been desired that optical communications be carried out by use of light in the 1.55-μm wavelength band. On the other hand, a number of single-mode optical fibers having a zero-dispersion wavelength in the vicinity of 1.3 μm have been laid so far, and hence there are needs for carrying out optical communications in the 1.55-μm wavelength band by utilizing such existing single-mode optical fiber transmission line networks. In such a case, when a dispersion-compensating fiber having a negative dispersion in the 1.55-μm wavelength band is connected to a single-mode optical fiber having a positive dispersion in the 1.55-μm wavelength band, the chromatic dispersion of the whole optical transmission line can be compensated for. For example, Japanese Patent Application Laid-Open No. HEI 8-136758 and Japanese Patent Application Laid-Open No. HEI 8-313750 disclose dispersion-compensating fibers comprising a double cladding structure. On the other hand, Japanese Patent Application Laid-Open No. HEI 6-11620 discloses a dispersion-compensating fiber comprising a triple cladding structure.

SUMMARY OF THE INVENTION

The inventors have studied the above-mentioned prior art and, as a result, have found problems as follows. Namely, in an optical transmission line constituted by a single-mode optical fiber and a dispersion-compensating fiber for compensating for the chromatic dispersion of the single-mode optical fiber, chromatic dispersion cannot be all prevented from occurring in wavelengths of the wavelength band in use, but it occurs at least in a wavelength band deviated from the vicinity of the zero-dispersion wavelength. Consequently, if various characteristics of the conventional dispersion-compensating fiber are not sufficiently optimized for compensating for the chromatic dispersion of a single-mode optical fiber having a zero-dispersion wavelength near 1.3 μm (hereinafter referred to as 1.3SMF), various transmission characteristics may be caused to fluctuate among wavelengths in optical communications of wavelength division multiplexing (WDM) system, in which different wavelengths of signal light are multiplexed so as to enable the transmission capacity to further enhance, and the like.

Here, dispersion slope is given by the gradient of a graph which indicates chromatic dispersion, and is expressed by a unit of $ps/nm^2/km$.

In order to overcome such problems as those mentioned above, it is an object of the present invention to provide a dispersion-compensating fiber comprising a structure which compensates for the chromatic dispersion of a 1.3SMF, improves, when applied to an optical transmission system including the 1.3SMF, the total dispersion slope in the optical transmission system as a whole in a wider wavelength band, and enables dispersion to be compensated for efficiently and its size to become smaller.

The dispersion-compensating fiber according to the present invention is an optical fiber for compensating for the chromatic dispersion of a 1.3SMF, and comprises a core region extending along a predetermined reference axis and a cladding region provided on the outer periphery of the core region. The core region is constituted by a core having an outer diameter $2a$. The cladding region is constituted by a first cladding, provided on the outer periphery of the core, having an outer diameter $2b$; a second cladding, provided on the outer periphery of the first cladding, having an outer diameter $2c$, and a third cladding provided on the outer periphery of the second cladding.

In this dispersion-compensating fiber, the refractive index $n_1$ of the core, the refractive index $n_2$ of the first cladding, the refractive index $n_3$ of the second cladding, and the refractive index $n_4$ of the third cladding satisfy the condition of $n_1 > n_3 > n_4 > n_2$. Also, the relative refractive index difference $\Delta_1$ of the core with respect to the third cladding and the relative refractive index difference $\Delta_2$ of the first cladding with respect to the third cladding satisfy at least the conditions of $1\% \leq \Delta_1 \leq 3\%$, and $\Delta_2 \leq -0.3\%$. Further, in this dispersion-compensating fiber, the outer diameter $2a$ of the core and the outer diameter $2c$ of the second cladding satisfy the condition of $2a/2c \leq 0.3$.

The dispersion-compensating fiber according to the present invention is characterized in that, when constituting an optical transmission system together with a 1.3SMF, it has a length sufficient for the optical transmission system to yield a total dispersion slope of $-0.024$ $ps/nm^2/km$ or more but $0.024$ $ps/nm^2/km$ or less with respect to respective light components having a shortest wavelength $\lambda_S$ and a longest wavelength $\lambda_L$ in signal wavelengths within the wavelength band in use.

Specifically, the dispersion-compensating fiber has a length $L_{DCF}$ which is set so as to satisfy the following condition with respect to light having a wavelength $\lambda$m in signal wavelengths within the wavelength band in use:

$$|D_{SMF}(\lambda m) \cdot L_{SMF} + D_{DCF}(\lambda m) \cdot L_{DCF}| \leq 200 \text{ ps/nm}$$

where $D_{SMF}(\lambda m)$ is the dispersion of the 1.3SMF at the wavelength $\lambda$m;

$L_{SMF}$ is the length of the 1.3SMF;

$D_{DCF}(\lambda m)$ is the dispersion of the dispersion-compensating fiber at the wavelength $\lambda$m; and $L_{DCF}$ is the length of the dispersion-compensating fiber.

More preferably, the length $L_{DCF}$ of the dispersion-compensating fiber is set so as to satisfy the following condition with respect to all signal wavelengths $\lambda_{all}$ of light within the wavelength band in use:

$$|D_{SMF}(\lambda_{all}) \cdot L_{SMF} + D_{DCF}(\lambda_{all}) \cdot L_{DCF}| \leq 200 \text{ ps/ nm}$$

where $D_{SMF}(\lambda_{all})$ is the dispersion of the 1.3SMF at all the wavelengths $\lambda_{all}$ in use;

$L_{SMF}$ is the length of the 1.3SMF;

$D_{DCF}(\lambda_{all})$ is the dispersion of the dispersion-compensating fiber at all the wavelengths $\lambda_{all}$ in use; and $L_{DCF}$ is the length of the dispersion-compensating fiber.

Thus, the dispersion-compensating fiber comprising a core region having a single core and a cladding region, provided on the outer periphery of the core region, having three claddings (a triple cladding structure) can improve the total dispersion slope in the optical transmission system to which the dispersion-compensating fiber is applied, if the refractive index and outer diameter of each part thereof are set so as to satisfy such conditions as those mentioned above. Also, when the dispersion-compensating fiber is wound like a coil so as to constitute a module, for example, it is possible to select a chromatic dispersion having an absolute value which is large enough to enable the dispersion to be compensated for efficiently and the apparatus to become smaller.

In particular, when a module employing a double cladding structure realizing an improvement in total dispersion slope is to be made smaller, the shortening of the optical fiber and the reduction of the bending loss occurring upon being wound like a coil cannot be achieved at the same time. Such a problem can be overcome when various characteristics of the optical fiber having the triple cladding structure as mentioned above are optimized.

For example, in the dispersion-compensating fiber having a triple cladding structure, the length of the dispersion-compensating fiber necessary for dispersion compensation can be made shorter as the absolute value of the dispersion having a negative value is greater, whereby the dispersion compensation can be made more efficient. In particular, when the relative refractive index difference $\Delta_1$ of the core with respect to the third cladding is set within the range of 1% or more but 3% or less, dispersion can be compensated for at a high efficiency.

Though the dispersion increases as the value of $\Delta_1$ is enhanced, it is necessary that, for example, the amount of $GeO_2$ added to the core be increased in order to enhance the value of $\Delta_1$. On the other hand, an increase in the amount of addition of $GeO_2$ causes the transmission loss to increase. Therefore, it is preferred that, within the range of condition concerning $\Delta_1$, the range of $\Delta_1$ be appropriately selected, in view of various conditions such as use, equipment, and the like, such that the value of $\Delta_1$ is lowered (e.g., $1\% \leq \Delta_1 \leq 2\%$) in the case where a lower transmission loss is required and that the value of $\Delta_1$ is enhanced (e.g., $2\% \leq \Delta_1 \leq 3\%$) in the case where a higher dispersion compensation efficiency due to a higher dispersion is required.

Here, in the dispersion-compensating fiber according to the present invention, the relative refractive index difference $\Delta_3$ of the second cladding with respect to the third cladding preferably satisfies the condition of $0\% < \Delta_3 \leq 0.1\%$. Also, the ratio of the outer diameter 2b of the first cladding to the outer diameter 2a of the core preferably satisfies the condition of $2.5 \leq 2b/2a \leq 3.5$. In addition, with respect to light having a wavelength of 1.55 μm, the dispersion-compensating fiber according to the present invention has a bending loss of 0.1 dB/m or less at a diameter of 60 mm, a polarization mode dispersion of 0.5 ps·km$^{-\frac{1}{2}}$ or less, and a transmission loss of 1 dB/km or less.

In practice, there is a case where such a dispersion-compensating fiber is employed as a small-size module wound like a coil. In this case, in particular, lowering the bending loss enables the apparatus to reduce its size and suppress its resultant increase in transmission loss.

When an optical transmission system is constituted by a 1.3SMF and the dispersion-compensating fiber having a length sufficient for compensating for the dispersion of the 1.3SMF as mentioned in the foregoing, this optical transmission system yields a total dispersion slope of $-0.024$ ps/nm$^2$/km or more but 0.024 ps/nm$^2$/km or less, preferably $-0.012$ ps/nm$^2$/km or more but 0.012 ps/nm$^2$/km or less, with respect to respective light components having the shortest wavelength $\lambda_s$ and the longest wavelength $\lambda_L$ in signal wavelengths within the wavelength band in use.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a view showing a cross-sectional structure of a dispersion-compensating fiber according to the present invention, whereas

FIG. 4A is a graph showing the dependence of dispersion compensation ratio on core's outer diameter in a first embodiment of the dispersion-compensating fiber (triple cladding structure) according to the present invention, whereas

DESCRIPTION OF THE PREFERRED EMBODIMENTS

In the following, embodiments of the dispersion-compensating fiber according to the present invention will be explained with reference to FIGS. 1A, 1B, 2, 3, 4A, 4B, and 5 to 7. Here, constituents identical to each other in the drawings will be referred to with numerals or letters identical to each other without repeating their overlapping explanations. Also, ratios of dimensions in the drawings do not always match those explained.

Figure 1A:
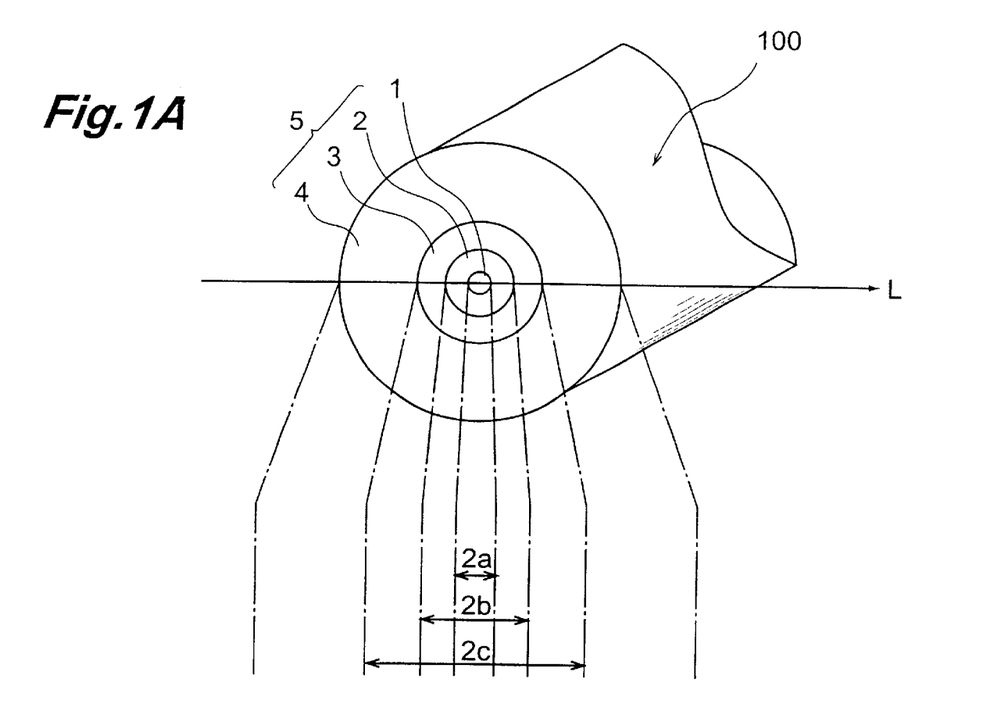
Figure 1B:
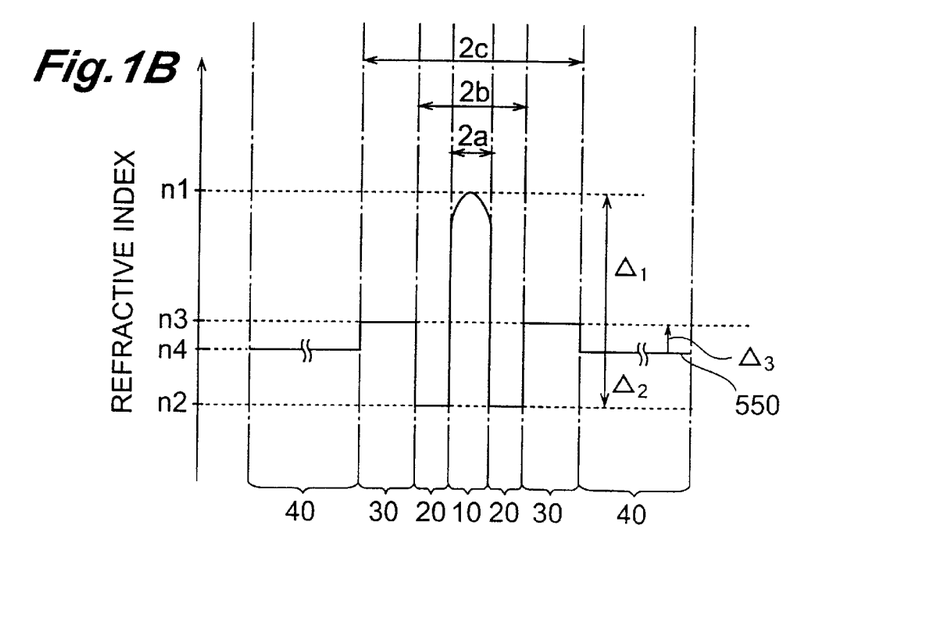
FIG. 1B is a chart showing the refractive index profile of the dispersion-compensating fiber shown in FIG. 1A.

FIG. 1A is a view showing a cross-sectional structure of a dispersion-compensating fiber according to the present invention. This dispersion-compensating fiber 100 comprises a core region having a core 1 with an outer diameter 2a, and a cladding region 5 of a triple cladding structure constituted by a first cladding 2, provided on the outer periphery of the core 1, having an outer diameter 2b, a second cladding 3, provided on the outer periphery of the first cladding 2, having an outer diameter 2c, and a third cladding 4 provided on the outer periphery of the second cladding 3. FIG. 1B is a chart showing a refractive index profile 550 of the dispersion-compensating fiber 100 shown in FIG. 1A in a diametric direction thereof (direction indicated by the line L in the chart). Here, the abscissa of the refractive index profile 550 shown in FIG. 1B corresponds to individual parts along the line L in FIG. 1A on a cross section perpendicular to the center axis of the core 1. Hence, in the refractive index profile 550 in FIG. 1B, areas 10, 20, 30, and 40 indicate the refractive indices of individual parts on the line L of the core 1, first cladding 2, second cladding 3, and third cladding 4, respectively.

The dispersion-compensating fiber 100 is an optical waveguide mainly composed of $SiO_2$ (silica glass), and its characteristics are controlled by the outer diameter and refractive index of each region constituting the dispersion-compensating fiber 100, and the like. Here, $\Delta$ in the refractive index profile 550 shown in FIG. 1B indicates the relative refractive index difference of each region with reference to the refractive index of the third cladding 4, and is defined as follows:

$$\Delta_1 = (n_1 - n_4)/n_4$$

$$\Delta_2 = (n_2 - n_4)/n_4$$

$$\Delta_3 = (n_3 - n_4)/n_4$$

Here, $n_1$, $n_2$, $n_3$, and $n_4$ are refractive indices of the core 1, first cladding 2, second cladding 3, and third cladding 4, respectively. Also, the relative refractive index difference $\Delta$ in this specification is expressed in terms of percent, and the refractive indices of individual regions in each defining expression may be arranged in any order. Consequently, a negative value of $\Delta$ indicates that the refractive index of its corresponding region is lower than the refractive index of the third cladding 4.

The dispersion-compensating fiber according to the present invention is configured such that the respective refractive indices of the above-mentioned individual regions 1 to 4 satisfy the following condition (1):

$$n_1 > n_3 > n_4 > n_2 \tag{1}$$

As a consequence, the respective relative refractive index differences of the individual regions with respect to the third cladding 4 satisfy the following condition (1a):

$$\Delta_1 > \Delta_3 > 0\% > \Delta_2 \tag{1a}$$

(Conditions (1) and (1a) are equivalent to each other.) Namely, they are configured such that $\Delta_1$ and $\Delta_3$ have positive values, $\Delta_2$ has a negative value, and $\Delta_1$ has the largest value.

An optical fiber with a triple cladding structure having such a refractive index profile is constructed, for example, as follows. The outermost third cladding 4 is formed from $SiO_2$. By contrast, the core 1 and the second cladding 3, which are mainly composed of $SiO_2$, are doped with respective predetermined amounts of $GeO_2$, such that their refractive indices are controlled so as to become higher than the refractive index of $SiO_2$. On the other hand, the first cladding 2 mainly composed of $SiO_2$ is doped with a predetermined amount of F (fluorine), such that its refractive index is controlled so as to become lower than that of $SiO_2$. Here, the configuration mentioned above is just an example of specific methods and configurations of refractive index control by means of such impurity doping, which is not restrictive. For example, the third cladding 4 may not be pure $SiO_2$, but may be doped with a predetermined amount of a refractive index adjusting agent such as F.

Their respective relative refractive index differences further satisfy the following conditions (2) and (3):

$$1\% \leq \Delta_1 \leq 3\% \tag{2}$$

$$\Delta_2 \leq -0.3\% \tag{3}$$

Also, their respective outer diameters satisfy the following condition (4):

$$2a/2c \leq 0.3 \tag{4}$$

When the refractive index and outer diameter of each region are set as mentioned above, a dispersion-compensating fiber capable of sufficiently improving a dispersion slope is obtained. Also, when the following conditions (5) and (6) are satisfied, a further preferable dispersion-compensating fiber is obtained.

$$0\% < \Delta_3 \leq 0.1\% \tag{5}$$

$$2.5 \leq 2b/2a \leq 3.5 \tag{6}$$

Here, as for the range of $1\% \leq \Delta_1 \leq 3\%$ of condition (2) concerning the relative refractive index difference $\Delta_1$ of the core 1 with respect to the third cladding 4, if the value of $\Delta_1$ is increased, then the absolute value of the dispersion having a negative value can be enhanced, whereby the dispersion compensation can be made more efficient. In order to increase the value of $\Delta_1$, on the other hand, it is necessary that, for example, the amount of $GeO_2$ added to the core 1 be increased so as to enhance the refractive index $n_1$ thereof. In this case, however, transmission loss would increase due to the increase in Rayleigh scattering caused by $GeO_2$ being added, and the like. Since the upper limit value of $\Delta_1$ is set to 3%, the dispersion-compensating fiber according to the present invention can suppress the transmission loss thereof to 1 dB/km or less, while compensating for the chromatic dispersion of the single-mode optical fiber.

Also, while polarization mode dispersion (PMD) enhances along with increases in out-of-roundness which represents the deviation of the form of the core 1 from a perfect circle, the polarization mode dispersion caused by the deviation from the perfect circle also increases as the refractive index of the core 1 is greater, i.e., the value of $\Delta_1$ is greater. Since the upper limit of $\Delta_1$ is suppressed to 3% or less, the dispersion-compensating fiber according to the present invention can suppress its polarization mode dispersion to 0.5 ps·km$^{-1/2}$ or less when the out-of-roundness is 0.5% or less, for example.

Figure 2:
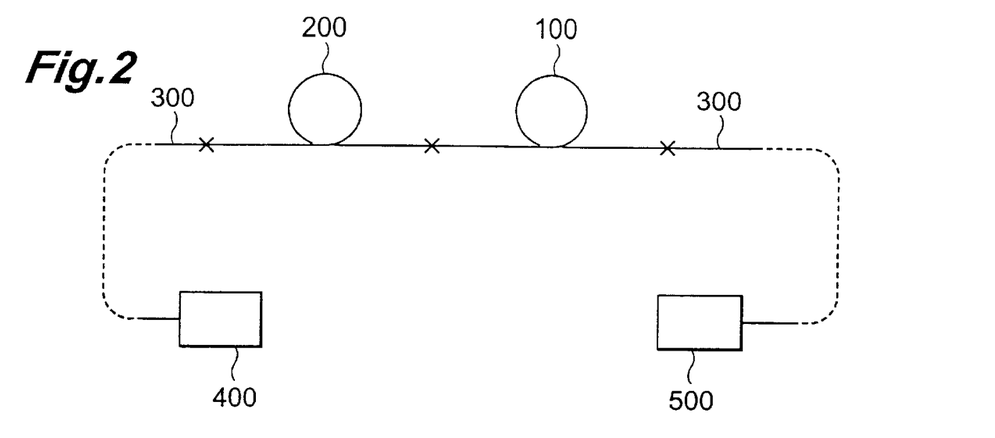
FIG. 2 is a view showing an example of an optical transmission system to which the dispersion-compensating fiber according to the present invention is applied.

FIG. 2 is a view showing a configurational example of an optical transmission system to which the dispersion-compensating fiber according to the present invention is applied. In this optical transmission system, one end (entrance end) of a 1.3SMF 200 is optically connected to a transmitter 400 by way of an optical fiber transmission line 300 such as a single-mode optical fiber, whereas the other end (exit end) thereof is optically connected to one end (entrance end) of the dispersion-compensating fiber 100 according to the present invention. On the other hand, the other end (exit end) of the dispersion-compensating fiber 100 is optically connected to a receiver 500 by way of an optical fiber transmission line 300 such as a single-mode optical fiber.

Here, the total dispersion and total dispersion slope in the optical transmission system to which the dispersion-compensating fiber 100 is applied are defined as follows. Namely, the total dispersion of the optical transmission system constituted, as shown in FIG. 2, by the 1.3SMF 200 with a length of $L_{SMF}$ having a dispersion $D_{SMP}$ (17 ps/nm/km at a wavelength of 1.55 μm) and a dispersion slope $S_{SMF}$ (0.06 ps/nm$^2$/km) and the dispersion-compensating fiber 100 with a length of $L_{DCF}$ having a dispersion $D_{DCF}$ and a dispersion slope $S_{DCF}$ is given by:

$$D_{SMF} \cdot L_{SMF} + D_{DCF} \cdot L_{DCF}.$$

Also, the total dispersion slope in the optical transmission system is given by:

$$(S_{SMF} \cdot L_{SMF} + S_{DCF} \cdot L_{DCF})/L_{SMF}.$$

Here, since the length of the dispersion-compensating fiber 100 is much shorter than that of the transmission line portion constituted by the dispersion-compensating fiber 100 and the 1.3SMF 200, its contribution to the total dispersion and total dispersion slope in the optical transmission system is negligible.

The dispersion-compensating fiber according to the present invention has such characteristics that, in the optical transmission system to which it is applied together with the 1.3SMF, the value of total dispersion slope becomes −0.024 ps/nm$^2$/km or more but 0.024 ps/nm$^2$/km or less under the condition where its dispersion is sufficiently compensated for with respect to light having a wavelength of 1.55 μm, i.e., under the condition where the total dispersion becomes zero.

The basis for this numerical range of total dispersion slope is as follows. Namely, in the case of WDM transmission with a signal bandwidth of 30 nm and a transmission length of 300 km, a difference of an accumulated chromatic dispersion becomes 216 ps/nm occurs between both ends of the signal band (the shortest and longest wavelengths in the signal band) when the total dispersion slope is 0.024 ps/nm$^2$/km. The limit of permissible difference of an accumulated chromatic dispersion in such optical transmission is described, for example, in "Optical Fiber Communication (OFC'96) Technical digest Postdeadline paper PD 19 (1996)"; and, according to its description, the limit of permissible dispersion width is about 200 ps/nm when the bandwidth is 32.4 nm in the optical transmission over 150 km of a single-mode optical fiber. In view of this, for carrying out wide-band, high-speed WDM transmission in an optical fiber transmission line having a length of 150 km or more, it is necessary that the total dispersion slope of the optical transmission line be −0.024 ps/nm$^2$/km or more but 0.024 ps/nm$^2$/km or less.

Further, when a dispersion-compensating fiber which is adapted to yield a total dispersion slope value of −0.012 ps/nm$^2$/km or more but 0.012 ps/nm$^2$/km or less is employed, an optical transmission system capable of higher-speed optical transmission can be realized. Namely, the total dispersion slope value is needed to be made further smaller in high-speed optical transmission at 20 Gbits/sec or at 30 Gbits/sec. According to the description in "Optical Fiber Communication (OFC'96) Technical digest Postdeadline paper PD 19 (1996)," optical transmission over a distance up to about 500 to 600 km is possible when the total dispersion slope is −0.012 ps/nm$^2$/km or more but 0.012 ps/nm$^2$/km or less.

Here, in order to constitute the optical transmission system as mentioned above, the length $L_{DCF}$ of the dispersion-compensating fiber is set so as to satisfy the following condition with respect to light having a wavelength λm in signal wavelengths within the wavelength band in use:

$$|D_{SMF}(\lambda m) \cdot L_{SMF} + D_{DCF}(\lambda m) \cdot L_{DCF}| \leq 200 \text{ ps/nm}$$

where $D_{SMF}(\lambda m)$ is the dispersion of the 1.3SMF at the wavelength λm;

$L_{SMF}$ is the length of the 1.3SMF;

$D_{DCF}(\lambda m)$ is the dispersion of the dispersion-compensating fiber at the wavelength λm; and $L_{DCF}$ is the length of the dispersion-compensating fiber.

More preferably, the length $L_{DCF}$ of the dispersion-compensating fiber is set so as to satisfy the following condition with respect to all signal wavelengths $\lambda_{all}$ of light within the wavelength band in use:

$$|D_{SMF}(\lambda_{all}) \cdot L_{SMF} + D_{DCF}(\lambda_{all}) \cdot L_{DCF}| \leq 200 \text{ ps/nm}$$

where $D_{SMF}(\lambda_{all})$ is the dispersion of the 1.3SMF at all the wavelengths $\lambda_{all}$ in use;

$L_{SMF}$ is the length of the 1.3SMF;

$D_{DCF}(\lambda_{all})$ is the dispersion of the dispersion-compensating fiber at all the wavelengths $\lambda_{all}$ in use; and $L_{DCF}$ is the length of the dispersion-compensating fiber.

The dispersion compensation ratio, which is employed as an index for evaluating the dispersion-compensating fiber together with the above-mentioned total dispersion slope value, will now be explained. In this specification, the dispersion compensation ratio is defined as the value obtained when the ratio of the dispersion slope of the dispersion-compensating fiber to the dispersion slope of the single-mode optical fiber at a wavelength of 1.55 μm is divided by the ratio of the dispersion of the dispersion-compensating fiber to the dispersion of the single-mode optical fiber at a wavelength of 1.55 μm, and represents, when an optical transmission system is constituted by the single-mode optical fiber and the dispersion-compensating fiber, the correlation between the total dispersion and total dispersion slope in the optical transmission system. Namely, letting $D_{SMF}$ be the dispersion of the single-mode optical fiber, $S_{SMF}$ be the dispersion slope thereof, $D_{DCF}$ be the dispersion of the dispersion-compensating fiber, and $S_{DCF}$ be the dispersion slope thereof, the dispersion compensation ratio DSCR is given by:

$$DSCR=(S_{DCF}/D_{DCF})/(S_{SMF}/D_{SMF}).$$

For example, in an optical transmission system having a dispersion compensation ratio of 100%, the ratio in length between the single-mode optical fiber and the dispersion-compensating fiber is set such that its total dispersion becomes zero, whereby the total dispersion slope value becomes 0 ps/nm$^2$/km simultaneously, thus completely compensating for the total dispersion and total dispersion slope at the same time. In an optical transmission system having a dispersion compensation ratio of 50%, for example, on the other hand, the total dispersion slope can be compensated for by only 50% even if the ratio in length between the single-mode optical fiber and the dispersion-compensating fiber is set such that the total dispersion becomes zero. In this case, if the dispersion slope of the single-mode optical fiber is 0.06 ps/nm$^2$/km, then the total dispersion slope after the compensation becomes 0.03 ps/nm$^2$/km. In an optical transmission system having a dispersion compensation ratio of 150%, for example, by contrast, the total dispersion slope can be compensated for in excess by 50% even if the ratio in length between the single-mode optical fiber and the dispersion-compensating fiber is set such that the total dispersion becomes zero. In this case, if the dispersion slope of the single-mode optical fiber is 0.06 ps/nm$^2$/km, then the total dispersion slope after the compensation becomes −0.03 ps/nm$^2$/km.

With regard to the optical transmission system to which the dispersion-compensating fiber according to the present invention is applied, the condition for the total dispersion slope to become −0.024 ps/nm$^2$/km or more but 0.024 ps/nm$^2$/km or less corresponds to, for example, the state where the dispersion compensation ratio is about 60% or more but 140% or less in the case where the dispersion-compensating fiber is connected to the single-mode optical fiber whose dispersion slope is 0.06 ps/nm$^2$/km. Similarly, the condition for the total dispersion slope of −0.012 ps/nm$^2$/km or more but 0.012 ps/nm$^2$/km or less corresponds to the state where the dispersion compensation ratio is about 80% or more but 120% or less.

The configuration of such an optical transmission system is not limited to that mentioned above. For example, though the dispersion-compensating fiber 100 is disposed downstream from the single-mode optical fiber 200 in FIG. 2, it may be located upstream from the single-mode optical fiber 200. Also, the optical transmission line of the optical transmission system shown in FIG. 2 may be an optical transmission line network capable of bidirectional communications. As the optical fiber transmission line 300, not only a single-mode optical fiber but also other modes of optical fibers may be employed as required. If necessary, repeaters and the like can be installed on the transmission line.

Specific embodiments of the dispersion-compensating fiber according to the present invention and their characteristics will now be explained. Here, all of various characteristics such as dispersion and dispersion slope in each of the embodiments set forth in the following are based on results of calculations employing a finite-element method.

(First Embodiment)

The cross-sectional structure of the dispersion-compensating fiber according to the first embodiment and its refractive index profile are similar to the cross-sectional structure shown in FIG. 1A and the refractive index profile shown in FIG. 1B, respectively; and, in the dispersion-compensating fiber according to the first embodiment, the relative refractive index difference $\Delta_1$ of the core 1 with respect to the third cladding 4, the relative refractive index difference $\Delta_2$ of the first cladding 2 with respect to the third cladding 4, the relative refractive index difference $\Delta_3$ of the second cladding 3 with respect to the third cladding 4, the ratio 2a/2c of the outer diameter 2a of the core 1 to the outer diameter 2c of the second cladding 3, and the ratio 2b/2c of the outer diameter 2b of the first cladding 2 to the outer diameter 2c of the second cladding 3 are set to 1.803%, −0.334%, 0.084%, 0.1, and 0.3, respectively. These numerical values satisfy the above-mentioned individual conditions (1), (2), (3), (4), (5), and (6).

Figure 3:
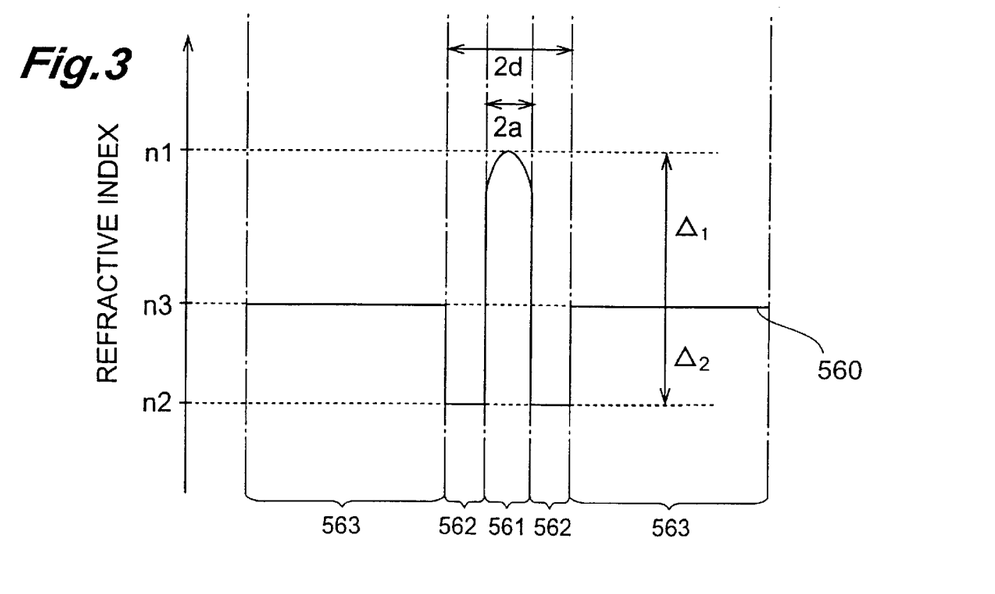
FIG. 3 is a chart showing the refractive index profile of a double cladding structure as a comparative example.

For comparison with the dispersion-compensating fiber according to the first embodiment, calculations were also carried out with respect to a dispersion-compensating fiber having a double cladding structure. FIG. 3 shows the refractive index profile 560 of the dispersion-compensating fiber of double cladding structure, which is a comparative example, and, the dispersion-compensating fiber of the comparative example corresponds to a structure in which the second cladding 3 (corresponding to the area 30) is excluded from the triple cladding structure shown in FIG. 1A (i.e., 2d=2b). Consequently, in the refractive index profile 560 of FIG. 3, areas 561, 562, and 563 indicate the refractive indices of the core portion, first cladding portion, and second cladding portion corresponding to the individual parts on the line L of the core 1, first cladding 2, and third cladding 4 shown in FIG. 1A, respectively. Hence, the dispersion-compensating fiber as the comparative example comprises the core portion having a refractive index n, and an outer diameter 2a, the first cladding portion, provided on the outer periphery of the core portion, having a refractive index $n_2$ (<$n_1$) and an outer diameter 2d, and the second cladding portion, provided on the outer periphery of the first cladding portion, having a refractive index $n_3$ (>$n_2$, and <$n_1$); whereas the relative refractive index difference $\Delta_1$ of the core portion with respect to the above-mentioned second cladding portion is 1.803%, the relative refractive index difference $\Delta_2$ of the first cladding portion with respect to the above-mentioned second cladding portion is −0.334%, and the ratio 2a/2d of the outer diameter 2a of the core portion to the outer diameter 2d of the first cladding portion is 0.35.

Figure 4A:
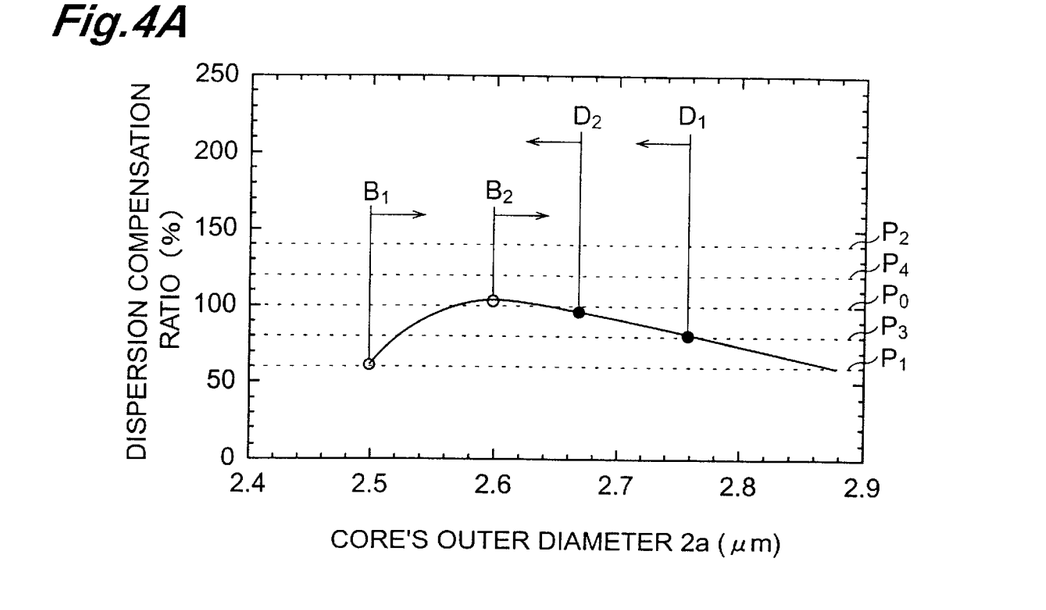
Figure 4B:
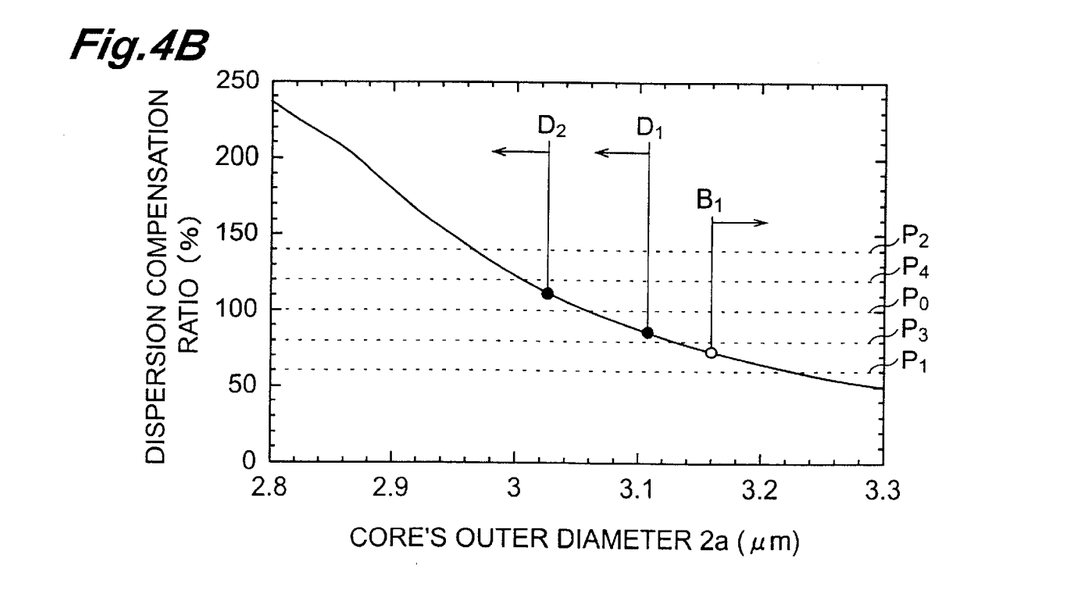
FIG. 4B is a graph showing the dependence of dispersion compensation ratio on core's outer diameter in the dispersion-compensating fiber (double cladding structure) as the comparative example.

FIG. 4A is a graph showing the dependence of dispersion compensation ratio on core's outer diameter concerning the dispersion-compensating fiber of triple cladding structure, whereas FIG. 4B is a graph showing the dependence of dispersion compensation ratio on core's outer diameter concerning the dispersion-compensating fiber of double cladding structure. In these graphs, dotted lines P0 to P4 indicate dispersion compensation ratios in the case where connection to a single-mode optical fiber having a dispersion slope of 0.06 ps/nm$^2$/km at a wavelength of 1.55 μm is assumed. Namely, dotted line P0 indicates the case where the dispersion compensation ratio is 100%, and corresponds to the state where the dispersion is completely compensated for and the total dispersion slope is 0 ps/nm$^2$/km. Dotted lines P1 and P2 indicate the cases where the dispersion compensation ratio is about 60% and 140%, respectively, and correspond to the states where the total dispersion slope is 0.024 and −0.024 ps/nm$^2$/km, respectively. Dotted lines P3 and P4 indicate the cases where the dispersion compensation ratio is about 80% and 120%, respectively, and correspond to the states where the total dispersion slope is 0.012 and −0.012 ps/nm$^2$/km, respectively.

In the dispersion-compensating fiber of double cladding structure (comparative example) shown in FIG. 4B, the permissible range width of core outer diameter 2a is about 0.14 μm in the dispersion compensation ratio of 80% to 120% and is about 0.22 μm in the dispersion compensation ratio of 60% to 140%. In the dispersion-compensating fiber of triple cladding structure according to the present invention shown in FIG. 4A, on the other hand, the permissible range width of core outer diameter 2a is about 0.24 μm in the dispersion compensation ratio of 80% to 120%, and is about 0.40 μm in the dispersion compensation ratio of 60% to 150%, whereby it can be seen that the permissible range of dispersion compensation ratio, i.e., the width of range of core outer diameter 2a in which the total dispersion slope can reside within the permissible range thereof, is much wider than that in the dispersion-compensating fiber of double cladding structure.

Figure 5:
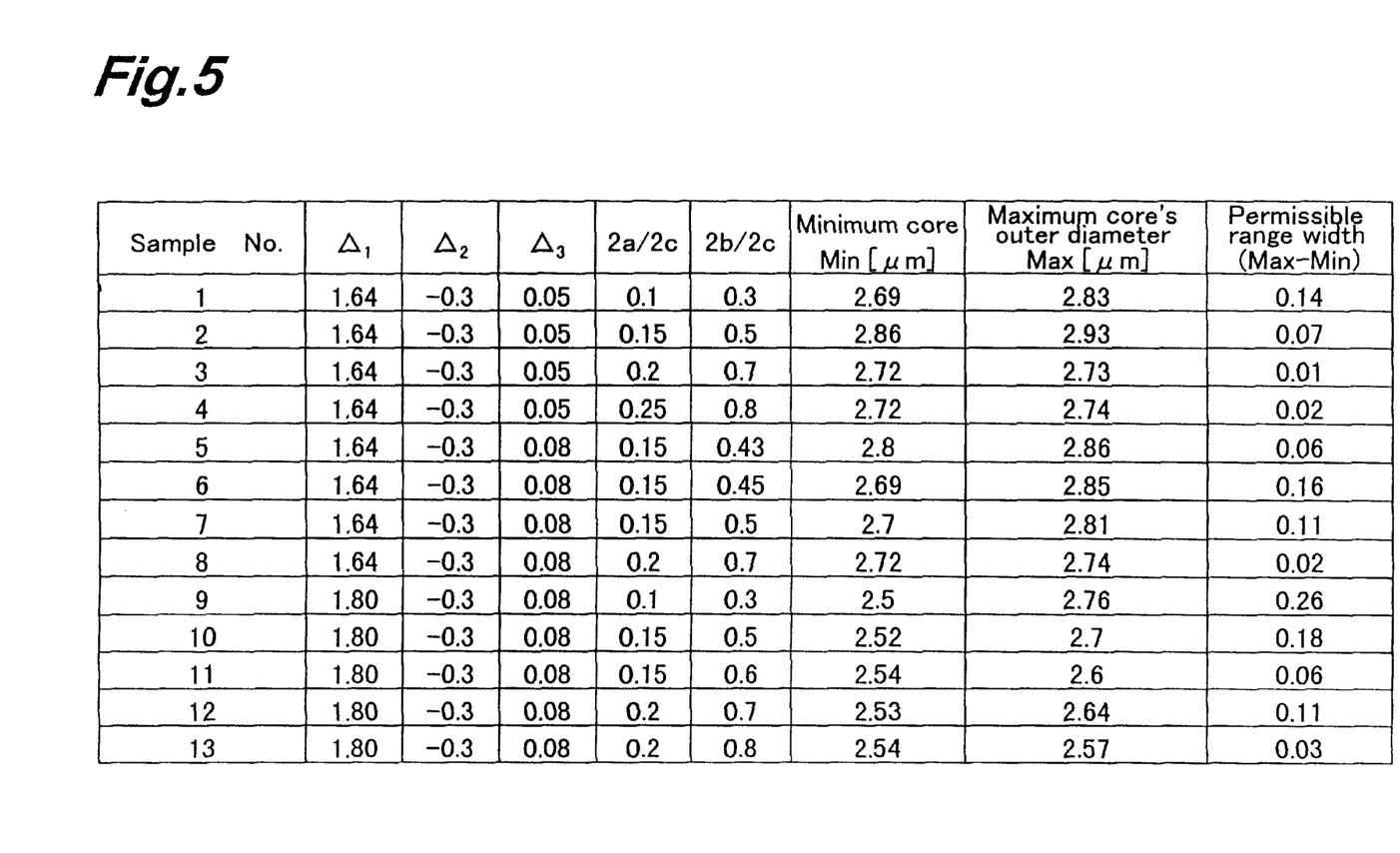
FIG. 5 is a table showing permissible ranges of core outer diameter in the dispersion-compensating fiber according to the present invention.

FIG. 5 shows a table of examples of calculations in which parameters concerning refractive index and outer diameters are changed under the conditions of dispersion<−80 ps/nm/km at a wavelength of 1.55 μm and bending loss<$10^{-3}$ dB/m at a diameter of 60 mm. In particular, the table of FIG. 5 shows the permissible range of core's outer diameter and its width when the dispersion compensation ratio is 80% to 120%.

For reducing the size of a module constructed when the dispersion-compensating fiber is wound like a coil, two points, i.e., (a) that the absolute value of the dispersion having a negative value is large and (b) that the bending loss is small, are important in addition to the dispersion compensation ratio and the total dispersion slope. Black points D1 and D2 in FIGS. 4A and 4B indicate points where the dispersion is −80 ps/nm/km and −100 ps/nm/km, respectively; and the area on the left side (smaller core outer diameter side) from each point is the range where the dispersion is not greater than the corresponding value whereas the absolute value becomes greater. On the other hand, white points B1 and B2 in FIGS. 4A and 4B indicate points where the bending loss at a diameter of 60 mm is $10^{-3}$ dB/m and $10^{-6}$ dB/m, respectively; and the area on the right side (greater core outer diameter side) from each point is the range where the bending loss is not greater than the corresponding value. Here, each of the dispersion and bending loss is expressed as a value for light having a wavelength of 1.55 μm.

As for these conditions, the permissible range width of outer diameter 2a of core in the dispersion-compensating fiber of triple cladding structure shown in FIG. 4A is about 0.26 μm when restricted by D1 and B1, and is about 0.06 μm when restricted by D2 and B2 which constitute a severer condition. In the dispersion-compensating fiber of double cladding structure shown in FIG. 4B, by contrast, no permissible core's outer diameter range exists even when restricted by D1 and B1 which constitute the mildest condition.

Thus, the superiority of the dispersion-compensating fiber of triple cladding structure designed so as to satisfy the above-mentioned respective conditions concerning refractive index and outer diameter is clear. In particular, as for any of the condition for the dispersion compensation ratio and total dispersion slope concerning the compensation for dispersion and dispersion slope and the condition for the dispersion and bending loss concerning the forming of a smaller-size module, the permissible range width of core's outer diameter can be made very wide in the dispersion-compensating fiber according to the present invention. This means, in particular, that the permissible range of errors in core's outer diameter at the time of fiber making is wide, whereby it is possible to facilitate the fiber making step and improve the yield thereof.

(Second Embodiment)

As with the first embodiment, the second embodiment has the structure and refractive index profile shown in FIGS. 1A and 1B. In the dispersion-compensating fiber according to the second embodiment, the relative refractive index difference $\Delta_1$ of the core 1 with respect to the third cladding 4, the relative refractive index difference $\Delta_2$ of the first cladding 2 with respect to the third cladding 4, and the relative refractive index difference $\Delta_3$ of the second cladding 3 with respect to the third cladding 4 are set to 1.8%, −0.35%, and 0.08%, respectively. Also, the outer diameter 2a of the core 1, the outer diameter 2b of the first cladding 2, and the outer diameter 2c of the second cladding 3 are set to 2.96 μm, 7.4 μm, and 29.6 μm, respectively. In this case, the ratio 2a/2c of the outer diameter 2a of the core 1 to the outer diameter 2c of the second cladding 3 is 0.1, and the ratio 2b/2c of the outer diameter 2b of the first cladding 2 to the outer diameter 2c of the second cladding 3 is 0.25. These values satisfy the above-mentioned conditions (1), (2), (3), (4), (5), and (6).

Various characteristics of the dispersion-compensating fiber at a wavelength of 1.55 μm determined under the following conditions:

dispersion: −121 ps/nm/km dispersion slope: −0.425 ps/nm²/km mode field diameter (MFD): 4.98 μm effective area ($A_{eff}$): 19.7 μm bending loss at a diameter of 40 mm: 2.4×$10^{-3}$ dB/m bending loss at a diameter of 60 mm: 5.9×$10^{-6}$ dB/m.

Also, the effective cutoff wavelength was 1.45 μm. In the above-mentioned characteristics, the absolute value of dispersion is sufficiently large, and, as for the values of dispersion and dispersion slope, the dispersion compensation ratio becomes substantially 100% with respect to a single-mode optical fiber having a dispersion of 17 ps/nm/km and a dispersion slope of 0.06 ps/nm²/km, for example. Also, the value of bending loss is sufficiently suppressed.

Figure 6:
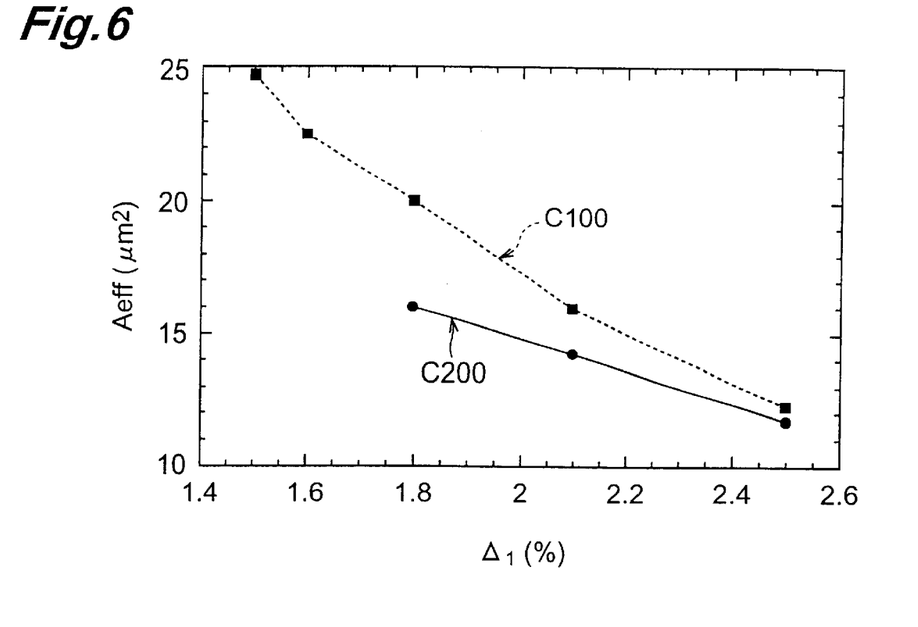
FIG. 6 is a graph showing relationships between effective area and $\Delta_1$ concerning the dispersion-compensating fiber (triple cladding structure) according to the present invention and the comparative example (double cladding structure)
Figure 7:
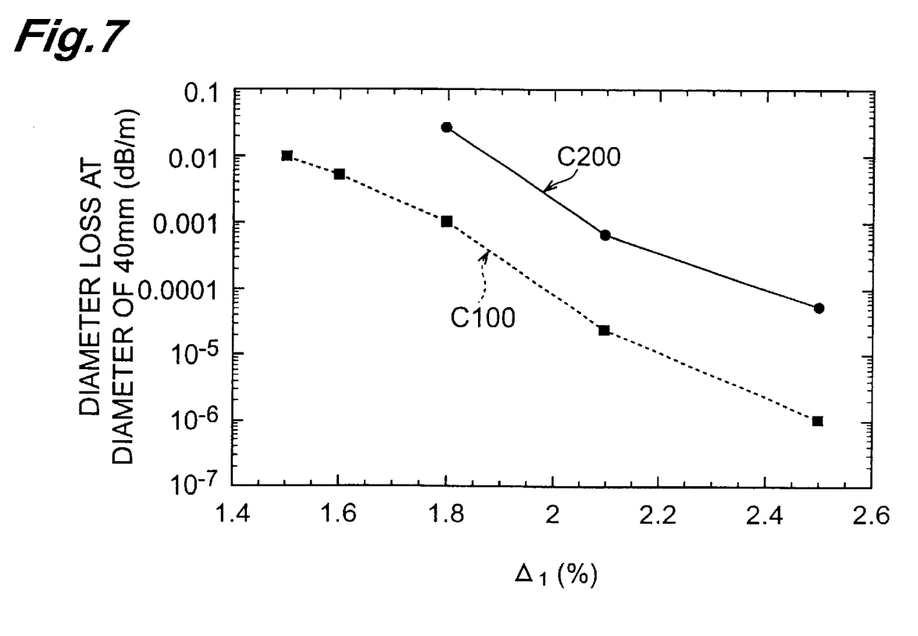
FIG. 7 is a graph showing relationships between bending loss at a diameter of 40 mm and $\Delta_1$ concerning the dispersion-compensating fiber (triple cladding structure) according to the present invention and the comparative example (double cladding structure).

On the other hand, since the amount of addition of Ge in the core is large in the dispersion-compensating fiber, while its effective area is small, its nonlinear property is so high that transmission characteristics are often adversely affected thereby. Therefore, it has been desired to enhance the effective area in order to suppress the nonlinear property. Hence, in such a dispersion-compensating fiber, it is necessary to achieve a large effective area and a small bending loss at the same time. FIG. 6 shows the relationship between the relative refractive index difference $\Delta_1$ of the core 1 with respect to the outermost cladding (the third cladding in the case of the triple cladding structure, and the second cladding in the case of the double cladding structure) and the effective area $A_{eff}$ (dependence of the effective area $A_{eff}$ on the relative refractive index difference $\Delta_1$) for each of the dispersion-compensating fiber of double cladding structure indicated by C200 (solid line) and the dispersion-compensating fiber of triple cladding structure indicated by C100 (dotted line). Also, FIG. 7 shows the relationship between the relative refractive index difference $\Delta_1$ of the core 1 with respect to the outermost cladding (the third cladding in the case of the triple cladding structure, and the second cladding in the case of the double cladding structure) and the bending loss at a diameter of 40 mm (dependence of the bending loss at a diameter of 40 mm on the relative refractive index difference $\Delta_1$) for each of the dispersion-compensating fiber of double cladding structure indicated by C200 (solid line) and the dispersion-compensating fiber of triple cladding structure indicated by C100 (dotted line).

Though the bending loss can be made smaller as the value of $\Delta_1$ is greater, the effective area $A_{eff}$ decreases in this case; and, for increasing the value of $\Delta_1$, it is necessary to enhance the amount of addition of $GeO_2$, for example, whereby Rayleigh scattering increases, thus enhancing transmission loss. Therefore, preferable conditions concerning the effective area and bending loss have been hard to achieve at the same time. By contrast, as can also be seen from FIGS. 6 and 7, the dispersion-compensating fiber (triple cladding structure) according to the present invention can yield a greater effective area $A_{eff}$ and smaller bending loss as compared with the dispersion-compensating fiber based on the double cladding, thus being able to achieve these conditions at the same time.

As mentioned in the foregoing, since the dispersion-compensating fiber according to the present invention employs a triple cladding structure, while parameters concerning the refractive index and outer diameter of each part thereof are optimized, so as to compensate for the dispersion with respect to a 1.3SMF, it can compensate for the dispersion of the 1.3SMF and, at the same time, can sufficiently compensate for the dispersion slope of the whole optical transmission system as well.

Also, since parameters such as the relative refractive index difference $\Delta_1$ of the core and the like are set such that the absolute value of dispersion becomes sufficiently large, the length of the dispersion-compensating fiber necessary for dispersion compensation can be shortened, and the bending loss can be made sufficiently small, whereby, when the dispersion-compensating fiber is wound like a coil so as to construct a module, the latter can be made smaller, and an effective compensation for dispersion and dispersion slope can be realized.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-compensating fiber for compensating for a dispersion of a single-mode optical fiber having a predetermined length and a zero-dispersion wavelength near 1.3 $\mu$m, said dispersion-compensating fiber comprising:

a core region extending along a predetermined reference axis and having an outer diameter $2a$; and a cladding region which is a region provided on the outer periphery of said core region, said cladding region comprising:

a first cladding provided on the outer periphery of said core and having an outer diameter $2b$;

a second cladding provided on the outer periphery of said first cladding and having an outer diameter $2c$; and a third cladding provided on the outer periphery of said second cladding, wherein a refractive index $n_1$ of said core, a refractive index $n_2$ of said first cladding, a refractive index $n_3$ of said second cladding, and a refractive index $n_4$ of said third cladding satisfy $n_1 > n_3 > n_4 > n_2$;

wherein relative refractive index difference $\Delta_1$ of said core and relative refractive index difference $\Delta_2$ of said first cladding, which are defined with reference to the refractive index $n_4$ of said third cladding satisfy $1\% \leq \Delta_1 \leq 3\%$, and $\Delta_2 \leq -0.3\%$;

wherein the ratio of the outer diameter of said core with respect to the outer diameter of said second cladding satisfies $2a/2c \leq 0.3$; and wherein, when said single-mode optical fiber with the predetermined length and said dispersion-compensating fiber having a length sufficient for compensating for the dispersion of said single-mode optical fiber are optically connected to each other to constitute an optical transmission system, said dispersion-compensating fiber causes a total dispersion slope in said optical transmission system to have an absolute value of 0.024 ps/nm²/km or less with respect to light having a shortest wavelength and light having a longest wavelength in signal wavelengths within a wavelength band in use.

2. A dispersion-compensating fiber according to claim 1, wherein the total dispersion slope in said optical transmission system is caused to have an absolute value of 0.02 ps/nm²/km or less with respect to light having the shortest wavelength and light having the longest wavelength in signal wavelengths within the wavelength band in use.

3. A dispersion-compensating fiber according to one of claims 1, wherein said dispersion-compensating fiber has a length $L_{DCF}$ satisfying, with respect to light having a wavelength $\lambda$m in signal wavelengths within the wavelength band in use, the following condition:

$|D_{SMF}(\lambda m) \cdot L_{SMF} + D_{DCF}(\lambda m) \cdot L_{DCF}| \leq 200$ ps/nm where $D_{SMF}(\lambda m)$ is the dispersion of the single-mode optical fiber at the wavelength $\lambda$m;

$L_{SMF}$ is the length of the single-mode optical fiber;

$D_{DCF}(\lambda m)$ is the dispersion of the dispersion-compensating fiber at the wavelength $\lambda$m; and $L_{DCF}$ is the length of the dispersion-compensating fiber.

4. A dispersion-compensating fiber according to claim 3, wherein the length $L_{DCF}$ of said dispersion-compensating fiber satisfies, with respect to all signal wavelengths $\lambda_{all}$ of light within the wavelength band in use, the following condition:

$|D_{SMF}(\lambda_{all}) \cdot L_{SMF} + D_{DCF}(\lambda_{all}) \cdot L_{DCF}| \leq 200$ ps/nm where $D_{SMF}(\lambda_{all})$ is the dispersion of the single-mode optical fiber at all the wavelengths $\lambda_{all}$ in use;

$L_{SMF}$ is the length of the single-mode optical fiber;

$D_{DCF}(\lambda_{all})$ is the dispersion of the dispersion-compensating fiber at all the wavelengths $\lambda_{all}$ in use; and $L_{DCF}$ is the length of the dispersion-compensating fiber.

5. A dispersion-compensating fiber according to claim 11 wherein a relative refractive index difference $\Delta_3$ of said second-cladding with respect to said third cladding satisfies the following condition:

$$0\% < \Delta_3 \leq 0.1\%.$$

6. A dispersion-compensating fiber according to claim 1, wherein the outer diameter $2a$ of said core and the outer diameter $2b$ of said first cladding satisfy the following condition:

$$2.5 \leq 2b/2a \leq 3.5.$$

7. A dispersion-compensating fiber according to claim 1, wherein, with respect to light having a wavelength of 1.55 μm, said dispersion-compensating fiber has a bending loss of 0.1 dB/m or less at a diameter of 60 mm, a polarization mode dispersion of 0.5 ps·km$^{-\frac{1}{2}}$ or less, and a transmission loss of 1 dB/km or less.

8. An optical transmission system comprising:
   a single-mode optical fiber having a predetermined length and a zero-dispersion wavelength near 1.3 μm; and
   a dispersion-compensating fiber according to claim 1;
   wherein said optical transmission system has a total dispersion slope whose absolute value is 0.024 ps/nm$^2$/km or less with respect to light having a shortest wavelength and light having a longest wavelength in signal wavelengths within a wavelength band in use.

9. An optical transmission system according to claim 8, wherein the absolute value of total dispersion slope in said optical transmission system is 0.02 ps/nm$^2$/km or less with respect to light having the shortest wavelength and light having the longest wavelength in signal wavelengths within the wavelength band in use.

10. A dispersion-compensating fiber for compensating for a dispersion of a single-mode optical fiber having a predetermined length and a zero-dispersion wavelength near a 1.3 μm wavelength band, said dispersion-compensating fiber comprising:
    a core region extending along a predetermined reference axis and having an outer diameter $2a$; and
    a cladding region which is a region provided on the outer periphery of said core region, said cladding region comprising:
    a first cladding provided on the outer periphery of said core and having an outer diameter $2b$;
    a second cladding provided on the outer periphery of said first cladding and having an outer diameter $2c$; and
    a third cladding provided on the outer periphery of said second cladding;
    wherein a refractive index $n_1$ of said core, a refractive index $n_2$ of said first cladding, a refractive index $n_3$ of said second cladding, and a refractive index $n_4$ of said third cladding satisfy $$n_1 > n_3 > n_4 > n_2;$$

wherein relative refractive index difference $\Delta_1$ of said core and relative refractive index difference $\Delta_2$ of said first cladding which are defined with reference to the refractive index $n_4$ of said third cladding satisfy $$1\% \leq \Delta_1 \leq 3\%,$$

and $$\Delta_2 \leq -0.3\%;$$

wherein the ratio of the outer diameter of said core with respect to the outer diameter of said second cladding satisfies $$2a/2c0.3; \text{ and}$$

wherein said dispersion-compensating fiber has a length sufficient for compensating for the dispersion of said single-mode optical fiber with the predetermined length.

11. A dispersion-compensating fiber according to one of claims 10, wherein said dispersion-compensating fiber has a length $L_{DCF}$ satisfying, with respect to light having a wavelength λm in signal wavelengths within the wavelength band in use, the following condition:

$$|D_{SMF}(\lambda m) \cdot L_{SMF} + D_{DCF}(\lambda m)) \cdot L_{DCF}| \leq 200 \text{ ps/nm}$$

where
   $D_{SMF}(\lambda m)$ is the dispersion of the single-mode optical fiber at the wavelength λm;
   $L_{SMF}$ is the length of the single-mode optical fiber;
   $D_{DCF}(\lambda m)$ is the dispersion of the dispersion-compensating fiber at the wavelength λm; and
   $L_{DCF}$ is the length of the dispersion-compensating fiber.

12. A dispersion-compensating fiber according to claim 11, wherein the length $L_{DCF}$ of said dispersion-compensating fiber satisfies, with respect to all signal wavelengths $\lambda_{all}$ of light within the wavelength band in use, the following condition:

$$|D_{SMF}(\lambda_{all}) \cdot L_{SMF} + D_{DCF}(\lambda_{all}) \cdot L_{DCF}| \leq 200 \text{ ps/nm}$$

where
   $D_{SMF}(\lambda_{all})$ is the dispersion of the single-mode optical fiber at all the wavelengths $\lambda_{all}$ in use;
   $L_{SMF}$ is the length of the single-mode optical fiber;
   $D_{DCF}(\lambda_{all})$ is the dispersion of the dispersion-compensating fiber at all the wavelengths $\lambda_{all}$ in use; and
   $L_{SMF}$ is the length of the dispersion-compensating fiber.

13. A dispersion-compensating fiber according to claim 10, wherein a relative refractive index difference $\Delta_3$ of said second cladding with respect to said third cladding satisfies the following condition:

$$0\% < \Delta_3 \leq 0.1\%.$$

14. A dispersion-compensating fiber according to claim 10, wherein the outer diameter $2a$ of said core and the outer diameter $2b$ of said first cladding satisfy the following condition:

$$2.5 \leq 2b/2a \leq 3.5.$$

15. A dispersion-compensating fiber according to claim 10, wherein, with respect to light having a wavelength of 1.55 μm, said dispersion-compensating fiber has a bending loss of 0.1 dB/m or less at a diameter of 60 mm, a polarization mode dispersion of 0.5 ps km$^{-\frac{1}{2}}$ or less, and a transmission loss of 1 dB/km or less.

16. An optical transmission system comprising:
    a single-mode optical fiber having a predetermined length and a zero-dispersion wavelength near 1.3 μm; and
    a dispersion-compensating fiber according to claim 10;
    wherein said optical transmission system has a total dispersion slope whose absolute value is 0.024 ps/nm$^2$/ km or less with respect to light having a shortest wavelength and light having a longest wavelength in signal wavelengths within a wavelength band in use.

17. An optical transmission system according to claim 16, wherein the absolute value of total dispersion slope in said optical transmission system is 0.02 ps/nm$^2$/km or less with respect to light having the shortest wavelength and light having the longest wavelength in signal wavelengths within the wavelength band in use.

* * * * *